(12) United States Patent
Miyatake

(10) Patent No.: US 6,462,694 B1
(45) Date of Patent: Oct. 8, 2002

(54) PRIORITY ENCODER AND ENCODING METHOD

(75) Inventor: Hisatada Miyatake, Ohtsu (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/694,528

(22) Filed: Oct. 23, 2000

(30) Foreign Application Priority Data

Oct. 25, 1999 (JP) .......................................... 11-302088

(51) Int. Cl.[7] ................................................ H03M 1/36
(52) U.S. Cl. ......................................... 341/160; 341/50
(58) Field of Search ........................... 341/160, 67, 50, 341/24; 710/126; 712/208

(56) References Cited

U.S. PATENT DOCUMENTS

| | | | | |
|---|---|---|---|---|
| 4,346,369 A | * | 8/1982 | Macy ........................... | 341/24 |
| 5,519,881 A | * | 5/1996 | Yoshida et al. .............. | 712/208 |
| 5,555,397 A | * | 9/1996 | Sasama et al. ............... | 395/498 |
| 5,602,545 A | * | 2/1997 | Ishii et al. .................... | 341/50 |
| 5,714,949 A | * | 2/1998 | Watabe ......................... | 341/67 |
| 5,964,857 A | * | 10/1999 | Srinivasan et al. ......... | 710/126 |

\* cited by examiner

*Primary Examiner*—Peguy Jean Pierre
*Assistant Examiner*—Jean Bruner Jeanglaude
(74) *Attorney, Agent, or Firm*—Lawrence D. Cutter, Esq.; Kevin P. Radigan, Esq.; Heslin Rothenberg Farley & Mesiti P.C.

(57) ABSTRACT

A priority encoding technique is provided which outputs a code corresponding to the highest-priority input line among input lines having a true value when true values are input to more than one of the input lines, which are prioritized and given codes. The technique includes performing higher-order-bit encoding by outputting higher-order bits corresponding to the group having its highest priority among those groups distinguished by the higher-order bits to which true values are input; and performing lower-order-bit encoding to output lower-order bits corresponding to the input line having the highest priority among input lines to which the true values are input. Further, the lower-order-bit encoding includes invalidating the input of true values into the input lines to groups having lower priorities than the highest-priority group distinguished by the higher-order bits.

28 Claims, 16 Drawing Sheets

Fig. 3

| | | | | | | | | | | | | | | | | |
|---|---|---|---|---|---|---|---|---|---|---|---|---|---|---|---|---|
| A0 | 1 | 0 | 1 | 0 | 1 | 0 | 1 | 0 | 1 | 0 | 1 | 0 | 1 | 0 | 1 | 0 |
| A1 | 1 | 1 | 0 | 0 | 1 | 1 | 0 | 0 | 1 | 1 | 0 | 0 | 1 | 1 | 0 | 0 |
| A2 | 1 | 1 | 1 | 1 | 0 | 0 | 0 | 0 | 1 | 1 | 1 | 1 | 0 | 0 | 0 | 0 |
| A3 | 1 | 1 | 1 | 1 | 1 | 1 | 1 | 1 | 0 | 0 | 0 | 0 | 0 | 0 | 0 | 0 |
| IN15 | , | , | , | , | , | , | , | , | , | , | , | , | , | , | , | 1 |
| IN14 | , | , | , | , | , | , | , | , | , | , | , | , | , | , | 1 | 0 |
| IN13 | , | , | , | , | , | , | , | , | , | , | , | , | , | 1 | 0 | 0 |
| IN12 | , | , | , | , | , | , | , | , | , | , | , | , | 1 | 0 | 0 | 0 |
| IN11 | , | , | , | , | , | , | , | , | , | , | , | 1 | 0 | 0 | 0 | 0 |
| IN10 | , | , | , | , | , | , | , | , | , | , | 1 | 0 | 0 | 0 | 0 | 0 |
| IN9 | , | , | , | , | , | , | , | , | , | 1 | 0 | 0 | 0 | 0 | 0 | 0 |
| IN8 | , | , | , | , | , | , | , | , | 1 | 0 | 0 | 0 | 0 | 0 | 0 | 0 |
| IN7 | , | , | , | , | , | , | , | 1 | 0 | 0 | 0 | 0 | 0 | 0 | 0 | 0 |
| IN6 | , | , | , | , | , | , | 1 | 0 | 0 | 0 | 0 | 0 | 0 | 0 | 0 | 0 |
| IN5 | , | , | , | , | , | 1 | 0 | 0 | 0 | 0 | 0 | 0 | 0 | 0 | 0 | 0 |
| IN4 | , | , | , | , | 1 | 0 | 0 | 0 | 0 | 0 | 0 | 0 | 0 | 0 | 0 | 0 |
| IN3 | , | , | , | 1 | 0 | 0 | 0 | 0 | 0 | 0 | 0 | 0 | 0 | 0 | 0 | 0 |
| IN2 | , | , | 1 | 0 | 0 | 0 | 0 | 0 | 0 | 0 | 0 | 0 | 0 | 0 | 0 | 0 |
| IN1 | , | 1 | 0 | 0 | 0 | 0 | 0 | 0 | 0 | 0 | 0 | 0 | 0 | 0 | 0 | 0 |
| IN0 | 1 | 0 | 0 | 0 | 0 | 0 | 0 | 0 | 0 | 0 | 0 | 0 | 0 | 0 | 0 | 0 |

Fig. 4

| NOR_A | NOR_B | NOR_C | NOR_D | A3 | A2 |
|---|---|---|---|---|---|
| 0 | — | — | — | 1 | 1 |
| 1 | 0 | — | — | 1 | 0 |
| 1 | 1 | 0 | — | 0 | 1 |
| 1 | 1 | 1 | 0 | 0 | 0 |

Fig. 5

| OR_0 | OR_1 | OR_2 | OR_3 | A1 | A0 |
|---|---|---|---|---|---|
| 1 | — | — | — | 1 | 1 |
| 0 | 1 | — | — | 1 | 0 |
| 0 | 0 | 1 | — | 0 | 1 |
| 0 | 0 | 0 | 1 | 0 | 0 |

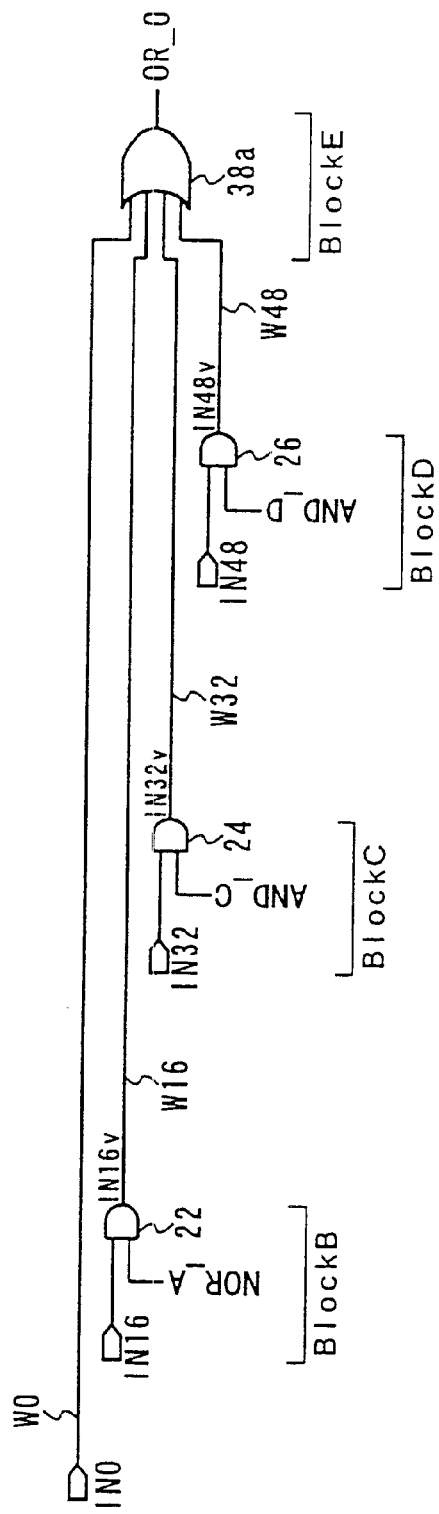
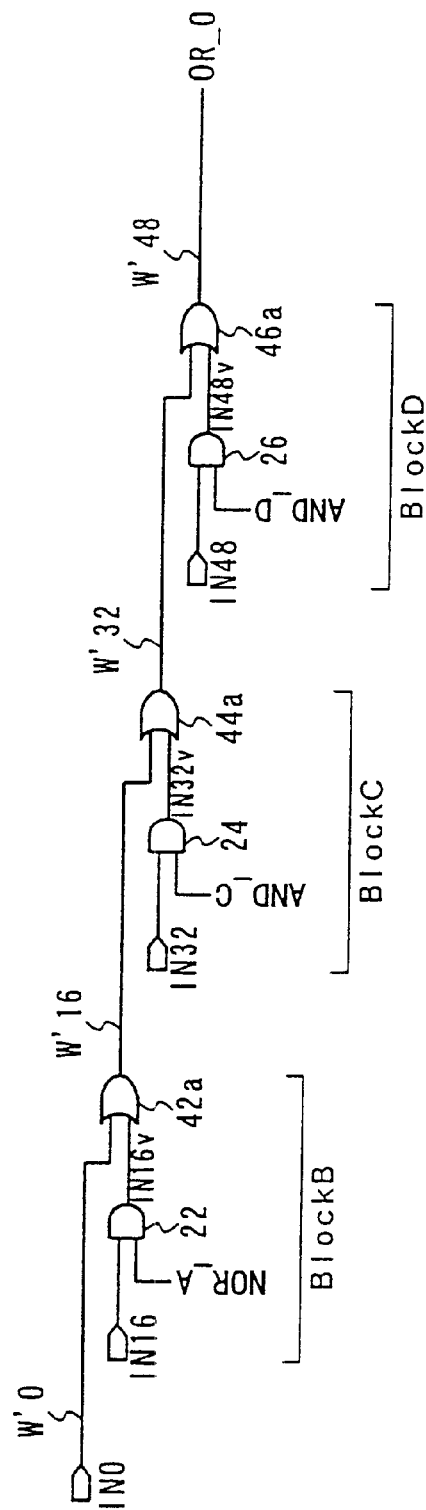
Fig. 8 (a)
Fig. 8 (b)

Fig. 14
(PRIOR ART)

| EI | IN0N | IN1N | IN2N | IN3N | IN4N | IN5N | IN6N | IN7N | A2 | A1 | A0 | GS | EO |
|---|---|---|---|---|---|---|---|---|---|---|---|---|---|
| 0 | 0 | 1 | 1 | 1 | 1 | 1 | 1 | 1 | 1 | 1 | 1 | 0 | 1 |
| 0 | - | 0 | 1 | 1 | 1 | 1 | 1 | 1 | 1 | 1 | 0 | 0 | 1 |
| 0 | - | - | 0 | 1 | 1 | 1 | 1 | 1 | 1 | 0 | 1 | 0 | 1 |
| 0 | - | - | - | 0 | 1 | 1 | 1 | 1 | 1 | 0 | 0 | 0 | 1 |
| 0 | - | - | - | - | 0 | 1 | 1 | 1 | 0 | 1 | 1 | 0 | 1 |
| 0 | - | - | - | - | - | 0 | 1 | 1 | 0 | 1 | 0 | 0 | 1 |
| 0 | - | - | - | - | - | - | 0 | 1 | 0 | 0 | 1 | 0 | 1 |
| 0 | - | - | - | - | - | - | - | 0 | 0 | 0 | 0 | 0 | 1 |
| 0 | 1 | 1 | 1 | 1 | 1 | 1 | 1 | 1 | 1 | 1 | 1 | 1 | 0 |
| 1 | - | - | - | - | - | - | - | - | 1 | 1 | 1 | 1 | 1 |

| IN0N | IN1N | IN2N | IN3N | IN4N | IN5N | IN6N | IN7N | A2 | A1 | A0 | HIT |
|------|------|------|------|------|------|------|------|----|----|----|-----|
| 0 | - | - | - | - | - | - | - | 0 | 0 | 0 | 1 |
| 1 | 0 | - | - | - | - | - | - | 0 | 0 | 1 | 1 |
| 1 | 1 | 0 | - | - | - | - | - | 0 | 1 | 0 | 1 |
| 1 | 1 | 1 | 0 | - | - | - | - | 0 | 1 | 1 | 1 |
| 1 | 1 | 1 | 1 | 0 | - | - | - | 1 | 0 | 0 | 1 |
| 1 | 1 | 1 | 1 | 1 | 0 | - | - | 1 | 0 | 1 | 1 |
| 1 | 1 | 1 | 1 | 1 | 1 | 0 | - | 1 | 1 | 0 | 1 |
| 1 | 1 | 1 | 1 | 1 | 1 | 1 | 0 | 1 | 1 | 1 | 1 |
| 1 | 1 | 1 | 1 | 1 | 1 | 1 | 1 | 1 | 1 | 1 | 0 |

| IN0N | IN1N | IN2N | IN3N | AB | AA | HITN |
|------|------|------|------|----|----|------|
| 0 | - | - | - | 1 | 1 | 0 |
| 1 | 0 | - | - | 1 | 0 | 0 |
| 1 | 1 | 0 | - | 0 | 1 | 0 |
| 1 | 1 | 1 | 0 | 0 | 0 | 0 |
| 1 | 1 | 1 | 1 | 0 | 0 | 1 |

PRIORITY ENCODER AND ENCODING METHOD

RELATED PATENT APPLICATION

This application claims priority from Japanese patent application number 11-302088, filed Oct. 25, 1999, which is hereby incorporated herein by reference in its entirety.

BACKGROUND OF THE INVENTION

1. Field of the Invention

The present invention relates to a priority encoder and an encoding method using the priority encoder, and more particularly to a compact and high-speed priority encoder and a high-speed encoding method.

2. Description of Related Art

The function of a priority encoder is to output a code corresponding to the highest-priority input line among a plurality of input lines having a true value when input signal is input to more than one of input lines which are prioritized and given codes. FIG. 13 shows an example of a prior encoder and FIG. 14 is a truth table showing inputs and outputs of the priority encoder shown in FIG. 13. In the priority encoder 100 (all the inputs are negative logic) shown in FIG. 13, when more than one of eight data inputs (IN7N, IN6N, IN5N, IN4N, IN3N, IN2N, IN1N, and IN0N) are simultaneously activated ("0"), a 3-bit code (binary code) representing the input having the highest priority among the activated inputs (this input will be hereinafter referred to as "highest-priority input") is output. As shown in FIG. 13, this code is generated by combining input signals and their inverted signals.

The input IN7N has the highest priority. The smaller the number t in INtN is, the lower the priority is. In this example, the highest-priority input is determined with respect to an active input ("0"). As shown in FIG. 14, when the input IN7N having the highest priority has the highest-priority true input, the output signals ("A2 A1 A0") of the encoder 100 are "0 0 0", and when the input IN0N having the lowest priority has the highest-priority true input, the output signals are "1 1 1". Thus, the output signals are signals in which a binary code corresponding to the number t of INtN is inverted. The mark "–" in FIG. 14 denotes "don't care". An output GS is a signal representing the presence or absence of active input signals into the encoder 100. An input EI and an output EO are signals for expansion, and the output EO is connected to the input EI of the next-stage encoder.

FIG. 15(a) shows another example of a priority encoder and FIG. 15(b) is a truth table showing inputs and outputs of the priority encoder shown in FIG. 15(a). A priority encoder 110 shown in FIG. 15(a) comprises a selector circuit 116 and a plurality of priority encoders 112 and 114. FIG. 16(a) shows an example of a 4-to-2 priority encoder 112, and FIG. 16(b) is a truth table showing inputs and outputs of the priority encoder 112 shown in FIG. 16(a). FIG. 17 shows an example of the selector circuit 116. Unlike the priority encoder 100 shown in FIG. 13 and its inputs and outputs shown in FIG. 14, the input IN0N has the highest priority in the priority encoder 110. The larger the number t in INtN is, the lower the priority is. As shown in FIG. 15(b), when the input IN0N having the highest priority has the highest-priority true input, the output signals ("A2 A1 A0") of the encoder 110 are "0 0 0", and when the input IN7N having the lowest priority has the highest-priority true input, the output signals are "1 1 1". Thus, the output signals are represented in binary notation, indicating the number t in INtN of the highest-priority input having a true value.

Eight data inputs (IN0N, IN1N, IN2N, IN3N, IN4N, IN5N, IN6N, and IN7N) are divided into two groups, namely a group of four higher-priority inputs (IN0N, IN1N, IN2N, and IN3N) and a group of four lower-priority inputs (IN4N, IN5N, IN6N, and IN7N). The 4-to-2 priority encoders 112 and 114 receives these two groups of inputs, respectively. The encoders 112 and 114 each output a 2-bit binary code representing the active highest-priority input of the four inputs. The selector circuit 116 outputs lower-order 2 bits ("A1 A0") of the output signals ("A2 A1 A0") in response to the output from the higher encoder 112.

By combination of a selector circuit and a plurality of priority encoders, and by expanding the input and output of the selector circuit, the priority encoder can be configured as a greater whole encoder, for example, a 64-to-6 priority encoder 120, by using four 16-to-4 priority encoders 122, as shown in FIG. 18. However, since the priority encoder contains a number of components as shown in FIG. 13, a combination of a plurality of priority encoders as shown in FIG. 18 increases the number of components in the greater whole encoder, which leads to the increase in the circuit size of the greater whole encoder, the increase in the number of circuit stages, and the reduction of processing speed.

SUMMARY OF THE INVENTION

Objects of the present invention are to downsize the priority encoder by reducing the number of components and to achieve a high-speed encoding.

The priority encoder of the present invention comprises:
- higher-order-bit encoding means for outputting a higher-order m-bit code corresponding to the group having the highest priority among those groups out of $2^m$ groups distinguished by higher-order m bits to which true values are input (hereinafter referred to as "highest-priority group distinguished by the higher-order m bits"); each of the $2^m$ groups consisting of $2^n$ input lines having common higher-order m bits of (m+n)-bit output code; and
- lower-order-bit encoding means for outputting a lower-order n-bit code corresponding to the input line having the highest priority among input lines to which true values are input; the input lines being part of $2^n$ input lines which make up the highest-priority group distinguished by the higher-order m bits and which are distinguished by the lower n bits of the (m+n)-bit output code.

An encoding method using the priority encoder of the present invention comprises the steps of:
- outputting higher-order bits corresponding to the group having the highest priority among those groups distinguished by higher-order bits to which true values are input (hereinafter referred to as "highest-priority group distinguished by the higher-order bits"); each of the groups distinguished by higher-order bits comprising input lines which are grouped on the basis of higher-order bits of the code; and
- outputting lower-order bits corresponding to the input line having the highest priority among input lines to which true values are input; the input lines being part of input lines which make up the highest-priority group distinguished by the higher-order bits and are distinguished by the lower bits of the output code.

BRIEF DESCRIPTION OF THE DRAWINGS

FIG. 3 is a truth table showing inputs and outputs of the priority encoder shown in FIG. 1;

FIG. 4 is a truth table showing inputs and outputs of a 4-to-2 priority encoder 20 included in the priority encoder shown in FIG. 1;

FIG. 5 is a truth table showing inputs and outputs of a 4-to-2 priority encoder 40 included in the priority encoder shown in FIG. 1;

FIGS. 8(a) and 8(b) are enlarged circuit diagrams showing further embodiments of a main part of the priority encoder of the present invention;

FIG. 14 is a truth table showing inputs and outputs of the priority encoder shown in FIG. 13;

DESCRIPTION OF THE PREFERRED EMBODIMENTS

Figure 1:
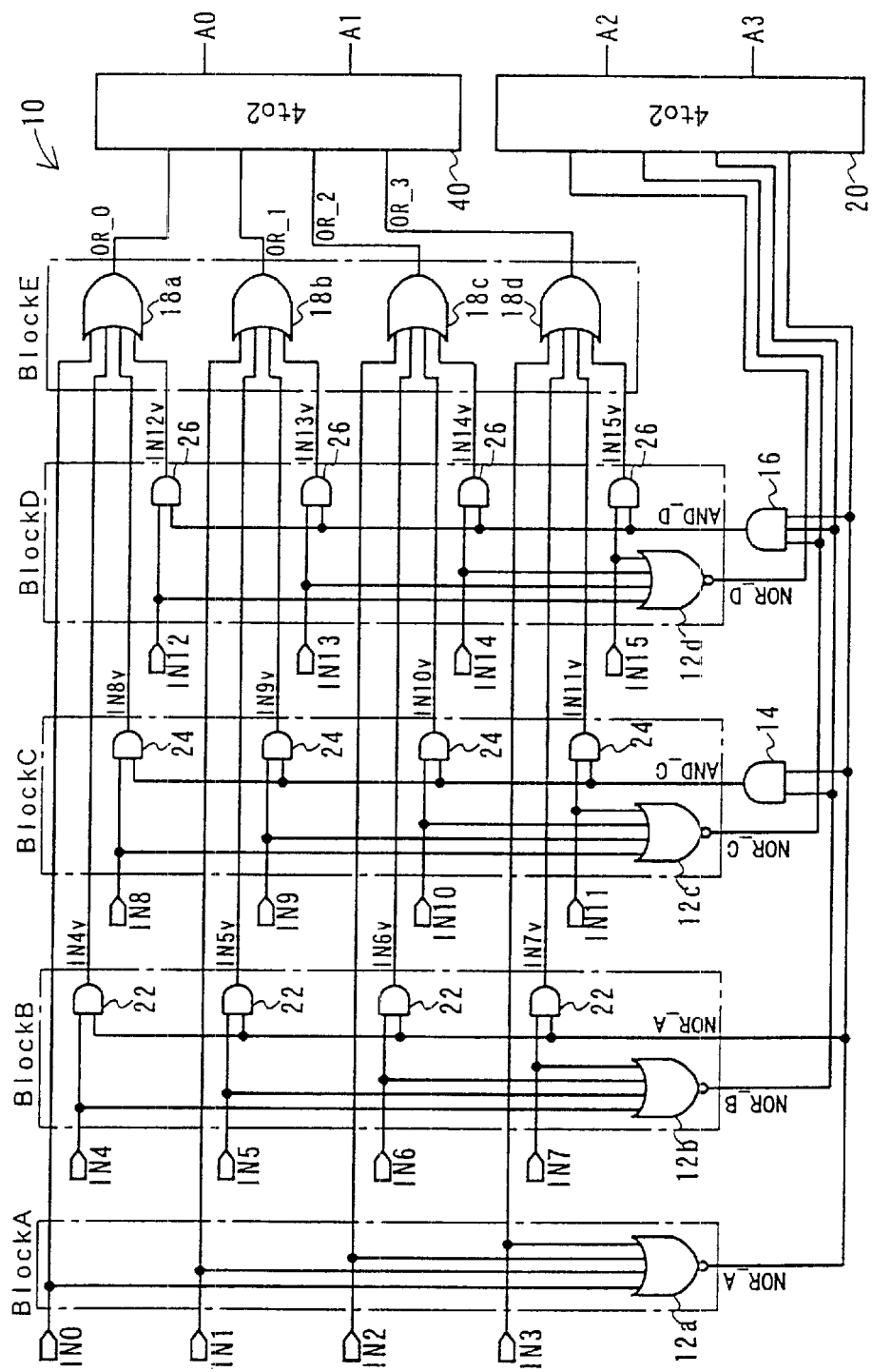
FIG. 1 is a circuit diagram showing an embodiment of a priority encoder of the present invention.

An embodiment of the priority encoder and the encoding method according to the present invention will hereinafter be described in detail with reference to the accompanying drawings. In this embodiment, as shown in FIG. 1, the priority encoder outputs a 4-bit code ("A3 A2 A1 A0") corresponding to the number of the input (namely, t of INt) having the highest priority among the active ("1") inputs in 16 inputs (IN0, IN1, IN2, IN3, IN4, IN5, IN6, IN7, IN8, IN9, IN10, IN11, IN12, IN13, IN14, IN15). This code is a signal in which a binary code corresponding to the number of the input is inverted. The lower the number of the input (t of INt) is, the higher the priority is. In this embodiment, input lines are grouped into blocks A, B, C, and D according to higher-order 2 bits ("A3 A2") of an output code ("A3 A2 A1 A0"). The higher-order 2 bits ("A3 A2") of the output code are output from the 4-to-2 priority encoder 20. The lower-order 2 bits ("A1 A0") are output from the 4-to-2 priority encoder 40 on the basis of an output from the block E.

The block A, B, C, and D are input groups of input lines whose higher-order bits of output code are "1 1", "1 0", "0 1", and "0 0", respectively. More specifically, the blocks A, B, C, and D receive the inputs IN0, IN1, IN2 and IN3, the inputs IN4, IN5, IN6 and IN7, the inputs IN8, IN9, IN10 and IN11, and the inputs IN12, IN13, IN14, and IN15, respectively.

Figure 2:
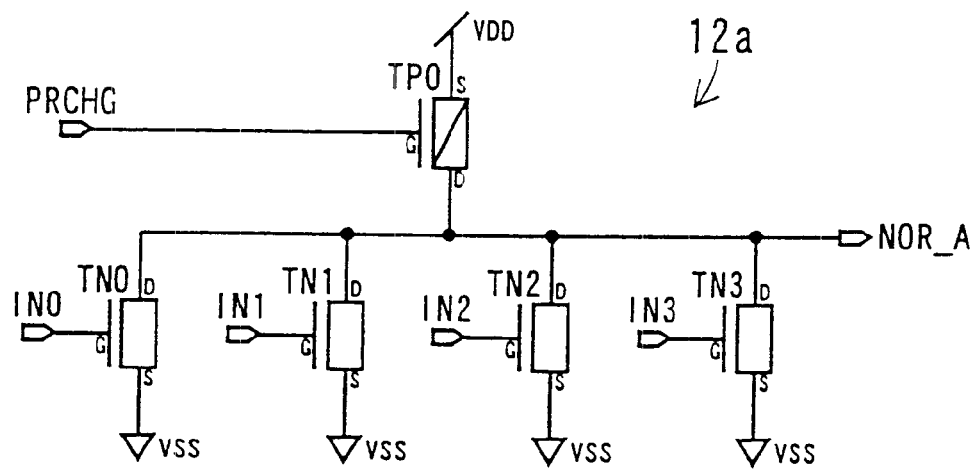
FIG. 2(a) shows an example of a NOR circuit included in the priority encoder of FIG. 1.
FIG. 2(b) shows an example of an OR circuit included in the priority encoder of FIG. 1.
Figure 2:
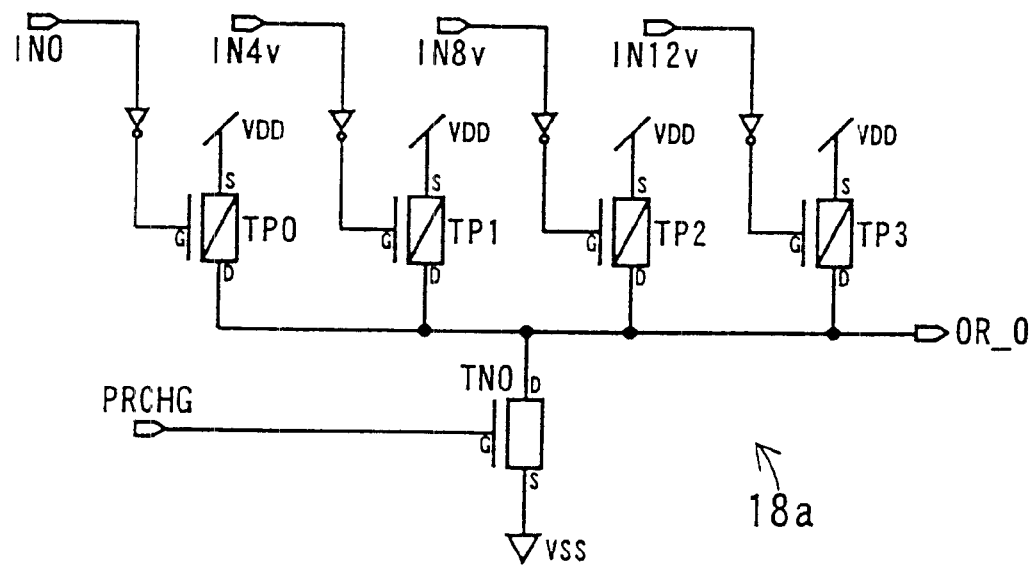

The block A comprises a NOR circuit 12a which receives the inputs IN0, IN1, IN2, and IN3. An output (NOR_A) of the NOR circuit 12a comes out of the block A. An example of the NOR circuit 12a is shown in FIG. 2(a). In this figure, TP0 indicates a pMOS transistor, and TN0, TN1, TN2, and TN3 each indicate an nMOS transistor. The output NOR_A is initially precharged to an H-level ("1") with a PRCHG signal being active and then when at least one of the inputs IN1, IN1, IN2, and IN3 becomes active ("1"), the NOR_A goes down to an L-level ("0").

The block B comprises a NOR circuit 12b and four AND circuits 22. The NOR circuits 12b receives the inputs IN4, IN5, IN6, and IN7. The AND circuits 22 each receive the output (NOR_A) from the NOR circuit 12a of the block A, while they each receive the inputs IN4, IN5, IN6, and IN7. The block B sends out an output (IN4v) of the AND circuit to which NOR_A and the input IN4 are input, an output (IN5v) of the AND circuit to which NOR_A and the input IN5 are input, an output (IN6v) of the AND circuit to which NOR_A and the input IN6 are input, an output (IN7v) of the AND circuit to which NOR_A and the input IN7 are input, and an output (NOR_B) of the NOR circuit 12b.

The block C comprises a NOR circuit 12c and four AND circuits 24. The NOR circuit 12c receives the inputs IN8, IN9, IN10, and IN11. The AND circuits 24 each receive a logical product (AND_C) of the output (NOR_A) from the NOR circuit 12a of the block A and an output (NOR_B) from the NOR circuit 12b of the block B, while they each receive the inputs IN8, IN9, IN10, and IN11. The logical product (AND_C) is obtained with an AND circuit 14. The block C sends out an output (IN8v) of the AND circuit to which AND_C and the input IN8 are input, an output (IN9v) of the AND circuit to which AND_C and the input IN9 are input, an output (IN10v) of the AND circuit to which AND_C and the input IN10 are input, an output (IN11v) of the AND circuit to which AND_C and the input IN11 are input, and an output (NOR_C) of the NOR circuit 12c.

The block D comprises a NOR circuit 12d and four AND circuits 26. The NOR circuit 12d receives the inputs IN12, IN13, IN14, and IN15. The AND circuits 26 each receive a logical products (AND_D) of the output (NOR_A) from the NOR circuit 12a of the block A, the output (NOR_B) from the NOR circuit 12b of the block B, and the output (NOR_C) from the NOR circuit 12c of the block C, while they each receive the inputs IN12, IN13, IN14, and IN15. The logical product (AND_D) is calculated in the AND circuit 16. The block D sends out an output (IN12v) of the AND circuit to which AND_D and the input IN12 are input, an output (IN13v) of the AND circuit to which AND_D and the input IN13 are input, an output (IN14v) of the AND circuit to which AND_D and the input IN14 are input, an output (IN15v) of the AND circuit to which AND_D and the input IN15 are input, and an output (NOR_D) of the NOR circuit 12d.

The block E comprises four OR circuits (18a, 18b, 18c, and 18d). The OR circuits each receive inputs corresponding to the outputs ("A3 A2 A1 A0") having common lower-order bits (A1 A0). The OR circuits 18a, 18b, 18c, and 18d receive inputs corresponding to lower-order bits "1 1", "1 0", "0 1", and "0 0", respectively. More specifically, the OR circuits 18a, 18b, 18c, and 18d receive the inputs IN0, IN4v, IN8v and IN12v, the inputs IN1, IN5v, IN9v and IN13v, the inputs IN2, IN6v, IN10v and IN14v, and the inputs IN3, IN7v, IN11v and IN15v, respectively. The block E sends out an output (OR__0) from the OR circuit 18a, an output (OR__1) from the OR circuit 18b, the output (OR__2) from the OR circuit 18c, and the output (OR__3) from the OR circuit 18d. An example of the OR circuit 18a is shown in FIG. 2(b). In this figure, TP0, TP1, TP2, and TP3 each indicate a pMOS transistor, and TN0 indicates an nMOS transistor. The OR__0 is initially precharged to an L-level ("0") with a PRCHG signal being active and then when at least one of IN0, IN4v, IN8v, and IN12v becomes active ("1"), the OR__0 goes up to an H-level ("1").

The output (NOR__A) from the NOR circuit 12a indicates the presence or absence of a true value or an active input in the inputs (IN0, IN1, IN2, and IN3) included in the block A. The output (NOR__A) becomes active ("0") if at least one true value is present, whereas it becomes inactive ("1") if true value is absent. Likewise, the outputs (NOR__B, NOR__C, and NOR__D) of the NOR circuits 12b, 12c, and 12d indicate the presence or absence of a true value in the inputs (IN4, IN5, IN6, and IN7) included in the block B, in the inputs (IN8, IN9, IN10, and IN11) included in the block C, and in the inputs (IN12, IN13, IN14, and IN15) included in the block D, respectively. The outputs (NOR__B, NOR__C and NOR__D) become active ("0") if at least one true value is present, whereas they become inactive ("1") if true value is absent. Thus, the outputs (NOR__A, NOR__B, NOR__C, and NOR__D) of the NOR circuits 12a, 12b, 12c, and 12d each indicate the presence or absence of a true value in each block.

The outputs (NOR__A, NOR__B, NOR__C, and NOR__D) from the NOR circuits 12a, 12b, 12c, and 12d are input to the 4-to-2 priority encoder 20. The outputs NOR__A, NOR__B, NOR__C, and NOR__D indicate the presence or absence of inputs corresponding to the outputs having higher-order bits of "1 1", "1 0", "0 1", and "0 0", respectively. As shown in FIG. 3 and FIG. 4, higher-order bits ("A3 A2 ") of the output code ("A3 A2 A1 A0") are obtained by encoding NOR__A, NOR__B, NOR__C, and NOR__D by the priority encoder 20.

On the other hand, the AND circuits 22 may invalidate the inputs IN4, IN5, IN6 and IN7 to the block B before sending them to the block E. Invalidation of these inputs is determined according to the output (NOR__A) from the NOR circuit 12a in the block A. If at least one of the inputs IN0, IN1, IN2, and IN3 is "1", the inputs IN4v, IN5v, IN6v and IN7v are invalidated ("IN4v IN5v IN6v IN7v"="0 0 0 0") regardless of inputs IN4, IN5, IN6 and IN7 because the output NOR__A becomes "0". Only if none of the inputs IN0, IN1, IN2, and IN3 are a true value, the inputs IN4, IN5, IN6 and IN7 to the block B are sent to the block E as they are ("IN4v IN5v IN6v IN7v"="IN4 IN5 IN6 IN7") because the output NOR__A becomes "1".

The AND circuits 24 may invalidate the inputs IN8, IN9, IN10 and IN11 to the block C before sending them to the block E. Invalidation of these inputs is determined by the output (AND__C) from the AND circuit 14. If at least one of the inputs IN0, IN1, IN2, IN3, IN4, IN5, IN6, and IN7 is "1", either output NOR A or NOR B becomes "0" and the output AND__C becomes "0". Therefore, inputs IN8v, IN9v, IN10v and IN11v are invalidated ("IN8v IN9v IN10v IN11v"="0 0 0 0") regardless of inputs IN8, IN9, IN10 and IN11. Only if none of the inputs IN0, IN1, IN2, IN3, IN4, IN5, IN6, and IN7 are a true value, the inputs IN8, IN9, IN10 and IN11 to the block C are sent to the block E as they are ("IN8v IN9v IN10v IN11v"="IN8 IN9 IN10 IN11") because both of outputs NOR__A and NOR__B become "1" and the output AND__C becomes "1".

The AND circuits 26 may invalidate the inputs IN12, IN13, IN14 and IN15 to the block D before sending them to the block E. Invalidation of these inputs is determined by the output (AND__D) from the AND circuit 16. If at least one of the inputs IN0, IN1, IN2, IN3, IN4, IN5, IN6, IN7, IN8, IN9, IN10, and IN11 is "1", at least one of outputs NOR__A, NOR__B and NOR__C becomes "0" and the output AND__D becomes "0". Therefore, inputs IN12v, IN13v, IN14v and IN15v are invalidated ("IN12v IN13v IN14v IN15v"="0 0 0 0") regardless of the inputs IN12, IN13, IN14 and IN15. Only if none of the inputs IN0, IN1, IN2, IN3, IN4, IN5, IN6, IN7, IN8, IN9, IN10, and IN11 is a true value, the inputs IN12, IN13, IN14 and IN15 to the block D are sent to the block E as they are ("IN12v IN13v IN14v IN15v"="IN12 IN13 IN14 IN15") because all the outputs NOR__A, NOR__B, and NOR__C become "1" and the output AND__D becomes "1".

As described above, the AND circuits 22, 24, and 26 invalidate or validate the inputs IN4, IN5, IN6 and IN7, the inputs IN8, IN9, IN10, and IN11, and the inputs IN12, IN13, IN14 and IN15, respectively. If any input to the block A (IN0, IN1, IN2, and IN3) has a true value, all the inputs other than the inputs IN0, IN1, IN2 and IN3 are sent to the block E in an invalidated state. If there is no true value in the block A ("IN0 IN1 IN2 IN3"="0 0 0 0") but there is at least one true value in the block B (IN4, IN5, IN6, and IN7), any input other than IN4, IN5, IN6 and IN7 is sent to the block E in an invalidated state. Alternatively, if there is no true value in the blocks A and B ("IN0 IN1 IN2 IN3 IN4 IN5 IN6 IN7"="0 0 0 0 0 0 0 0") but there is at least one true value in the block C (IN8, IN9, IN10, and IN11), any input other than IN8, IN9, IN10 and IN11 is sent to the block E in an invalidated state. Alternatively, if there is no true value in the blocks A, B and C ("IN0 IN1 IN2 IN3 IN4 IN5 IN6 IN7 IN8 IN9 IN10 IN11"="0 0 0 0 0 0 0 0 0 0 0 0") but there is at least one true value in the block D (IN12, IN13, IN14, and IN15), any input other than IN12, IN13, IN14 and IN15 is sent to the block E in an invalidated state. The outputs (OR__0, OR__1, OR__2, and OR__3) from the OR circuits 18a, 18b, 18c, and 18d indicate the presence or absence of a true value in the respective input lines included in the highest-priority block (block A, B, C, or D) among the blocks to which true values are input.

The outputs OR__0, OR__1, OR__2, and OR__3 from the OR circuits 18a, 18b, 18c, and 18d are input into the 4-to-2 priority encoder 40. The outputs OR__0, OR__1, OR__2, and OR__3 indicate the presence or absence of a true value in the respective input lines included in the highest-priority block among the blocks to which true values are input. Specifically, the outputs OR__0, OR__1, OR__2, and OR__3 indicate the presence or absence of a true value to inputs corresponding to an output code whose lower-order bits are "1 1", "1 0", "0 1", and "0 0", respectively. As shown in FIG. 3 and FIG. 5, the outputs OR__0, OR__1, OR__2, and OR__3 are encoded by the priority encoder 40 to obtain lower-order bits ("A1 A0") of the outputs ("A3 A2 A1 A0").

In the present invention, the blocks A, B, C, and D do not comprise any priority encoders. The block A comprises only a NOR circuit, and the blocks B, C, and D each comprise a NOR circuit and AND circuits only. There are only two priority encoders used in the present invention: the one is the priority encoder 20 for outputting higher-order bits of a output code; and the other is the priority encoder 40 which outputs lower-order bits of the code. In general, an OR circuit and AND circuit are superior to a priority encoder in reducing a circuit size.

In the present invention, the whole priority encoder comprises fewer priority encoders than the conventional one, and therefore the reduction in circuit size can be achieved. For example, since the blocks A, B, C, D comprise a NOR circuit and AND circuits instead of priority encoders, the reduction in circuit stages and a high-speed encoding can be achieved. In the present invention, higher-order bits and lower-order bits can be encoded by separate two priority encoders 20 and 40, and therefore an even higher speed encoding can be achieved.

Figure 6:
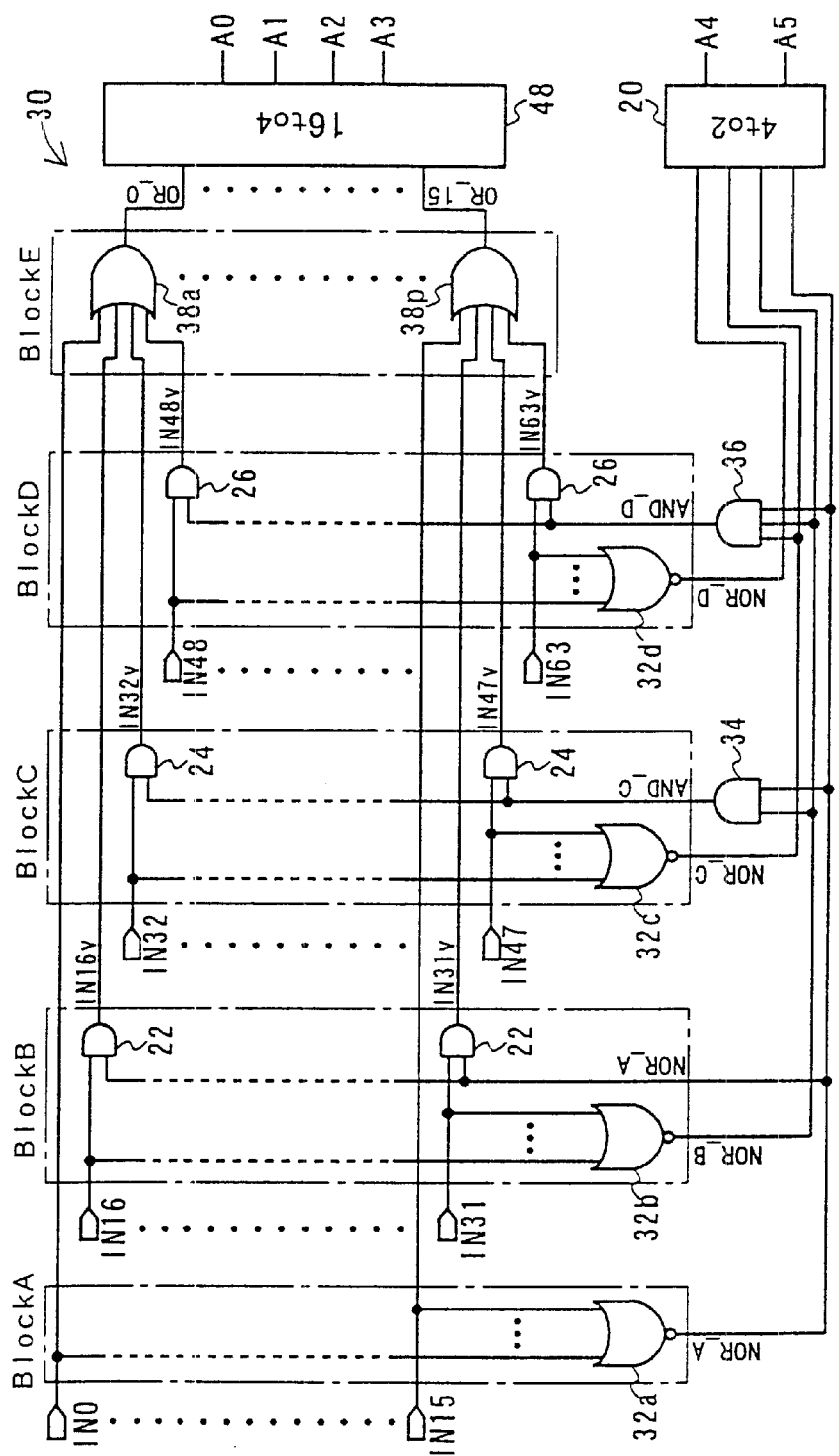
FIG. 6 is a circuit diagram showing another embodiment of the priority encoder of the present invention.
Figure 18:
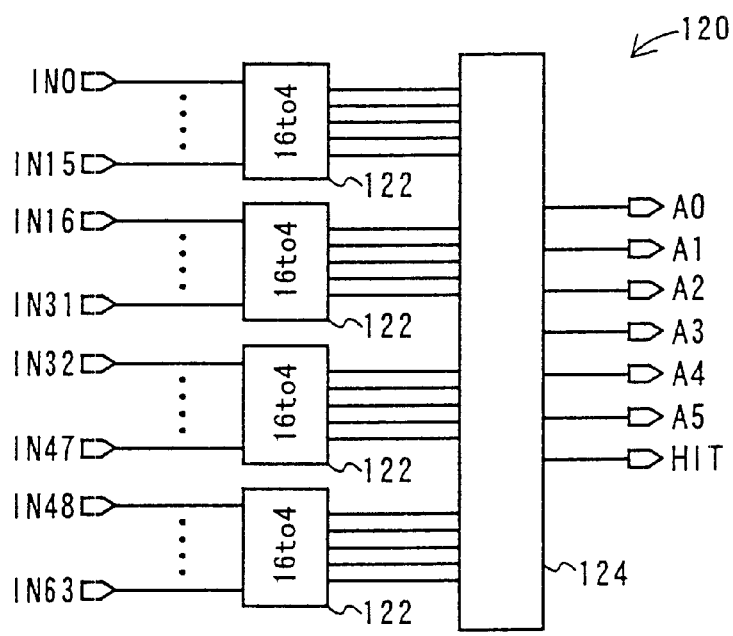
FIG. 18 is a block diagram showing a further example of a conventional priority encoder.

FIG. 6 shows another example of the priority encoder of the present invention. This priority encoder 30 outputs a 6-bit code ("A5 A4 A3 A2 A1 A0") representing the highest-priority input among a plurality of active ("1") inputs in 64 inputs (IN0 to IN63). The 64-to-6 priority encoder 30 shown in FIG. 6 has two more lower-order bits than the priority encoder 10 shown in FIG. 1. The blocks A, B, C, and D receives the inputs IN0 to IN15, the inputs IN16 to IN31, the inputs IN32 to IN47, and the inputs IN48 to IN63, respectively. The block E comprises OR circuits 38*a* to 38*p* to each of which signals from input lines having the common lower-order bits in each block are input. The outputs (OR_0 to OR_15) from the OR circuits 38*a* to 38*p* are input into a 16-to-4 priority encoder 48. Just as in the above case, only two priority encoders are used in this case for separately outputting higher-order bits and lower-order bits. The 4-to-2 priority encoder 20 outputs higher-order bits, and the 16-to-4 priority encoder outputs lower-order bits. Compared to a conventional 64-to-6 priority encoder 120 shown in FIG. 18, it is clear that the number of 16-to-4 priority encoders of a large circuit size is significantly reduced in the present invention.

Figure 7:
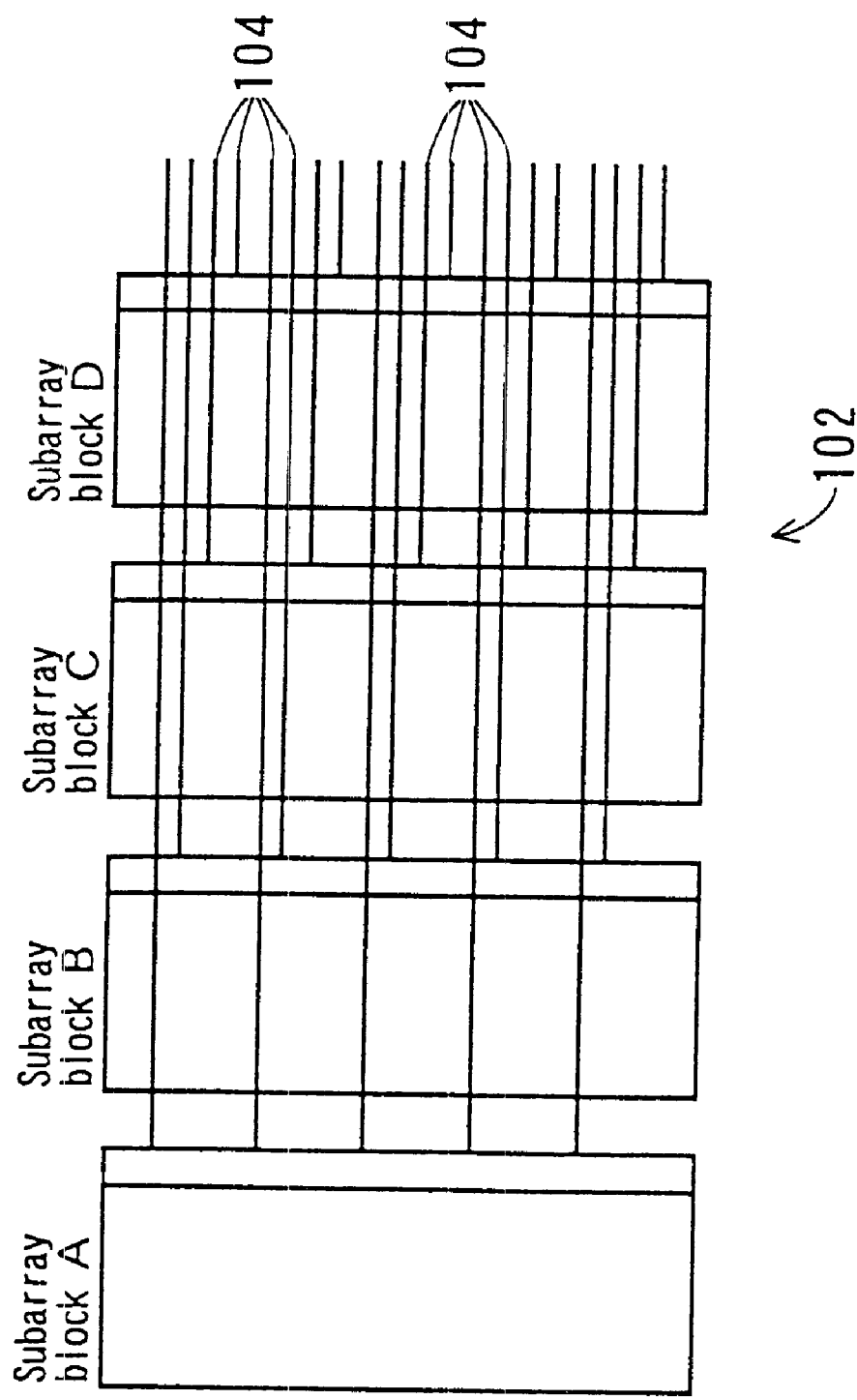
FIG. 7 is a conceptual view of a memory divided into subarray blocks.

The priority encoder and the encoding method of the present invention can be used in a content addressable memory ("CAM"). In general, where memory capacity is large, a memory 102 is divided into a plurality of subarray blocks, for example, four subarray blocks A, B, C, and D as shown in FIG. 7. Outputs 104 (for example, outputs indicating matches and mismatches of words) from memory cell arrays in each subarray block are input into a priority encoder. These memory cell arrays are systematically arranged. Conventionally, each of subarray blocks A, B, C, and D needs to include a priority encoder. However, in the priority encoder and the encoding method of the present invention, the blocks A to D shown in FIGS. 1 and 6 are included in the subarray blocks A to D, so that each subarray block only needs to include a NOR circuit and AND circuits. Since priority encoders do not need to be included in subarray blocks, subarray blocks can be downsized. This downsizing of subarray blocks allows downsizing of the whole memory and shortening of signal lines which control the whole memory and signal lines such as global word lines across a wide area. Thus, downsizing, high-speed, and low power consumption of memory can be achieved.

As shown in FIG. 8(*b*), the block B, C, and D may comprise OR circuits 42*a*, 44*a*, and 46*a* to reduce wirings between blocks to one. FIG. 8(*a*) is an enlarged circuit diagram of a main part of the priority encoder 30 shown in FIG. 6, mainly showing input lines IN0, IN16, IN32, and IN48, and OR circuit 38*a*. As shown in FIG. 8(*a*), where the logical sum of the inputs IN0, IN16*v*, IN32*v*, and IN48*v* is determined by the OR circuit 38*a* in the block E, there are two wirings (W0, W16) between blocks B and C, three wirings (W0, W16, W32) between blocks C and D, and four wirings (W0, W16, W32, W48) between blocks D and E. As shown in FIG. 8(*b*), where the blocks B, C, and D comprise the OR circuits 42*a*, 44*a*, and 46*a*, respectively, only one wiring (W'0, W'16, W'32, W'48) is required between every two blocks.

Figure 9:
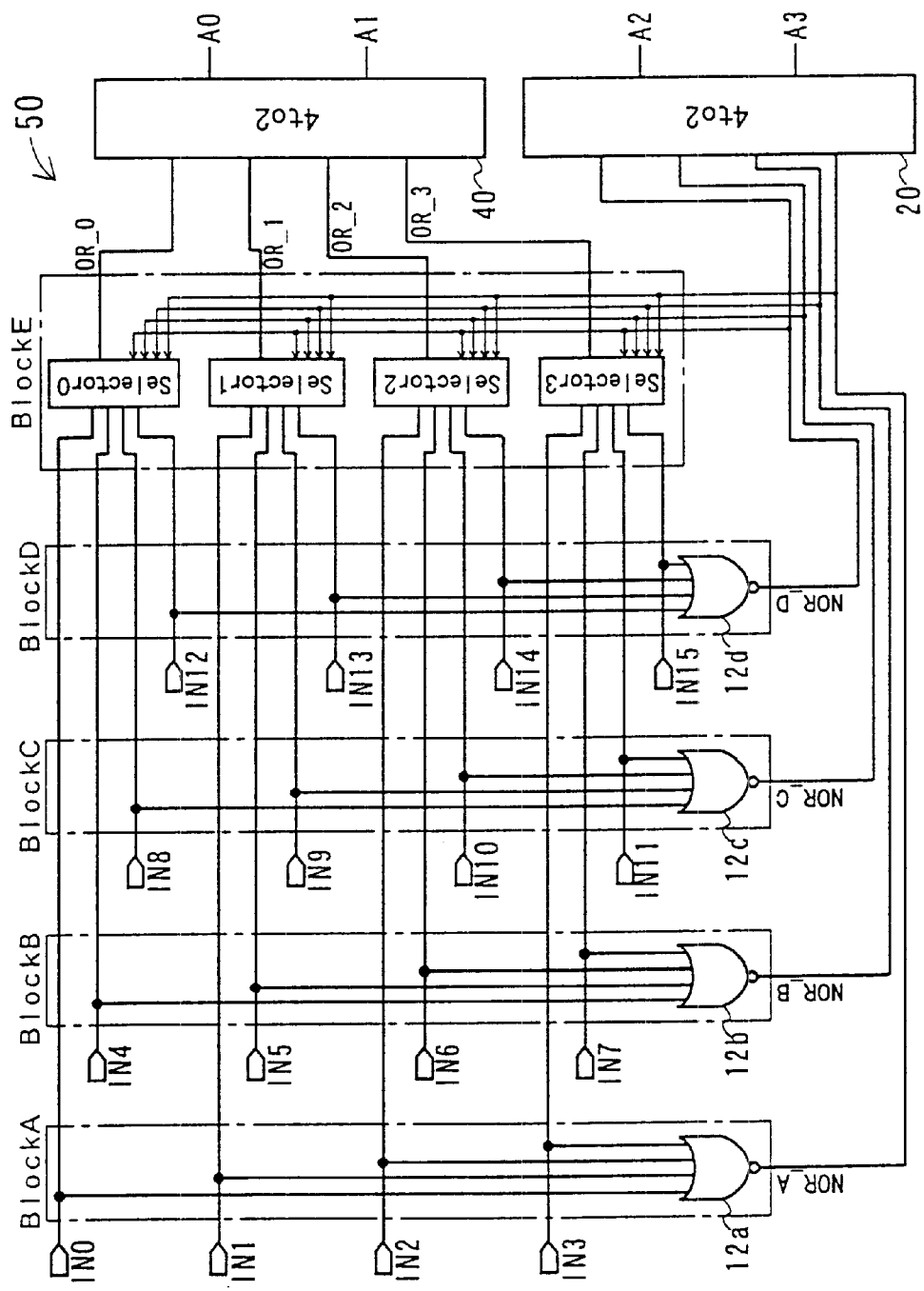
FIG. 9 is a circuit diagram showing a still further embodiment of the priority encoder of the present invention.

As shown in FIG. 9, the blocks A, B, C, and D may comprise the NOR circuits 12*a*, 12*b*, 12*c*, and 12*d*, respectively, and the block E may comprise the selector circuits 0, 1, 2, and 3. A selection control signal input terminal of each selector circuit receives outputs (NOR_A, NOR_B, NOR_C, and NOR_D) from the NOR circuits. The selector circuits 0, 1, 2 and 3 selectively output one of the inputs IN0, IN4, IN8 and IN12, one of the inputs IN1, IN5, IN9 and IN13, one of the inputs IN2, IN6, IN10 and IN14, and one of the inputs IN3, IN7, IN11 and IN15, respectively, to the 4-to-2 priority encoder 40 as an output OR_0, OR_1, OR_2 and OR_3 in accordance with an output of each NOR circuit. The inputs selected by the selector circuits 0, 1, 2, and 3 are included in the highest-priority block (block A, B, C, or D) among the blocks to which true values are input.

Figure 10:
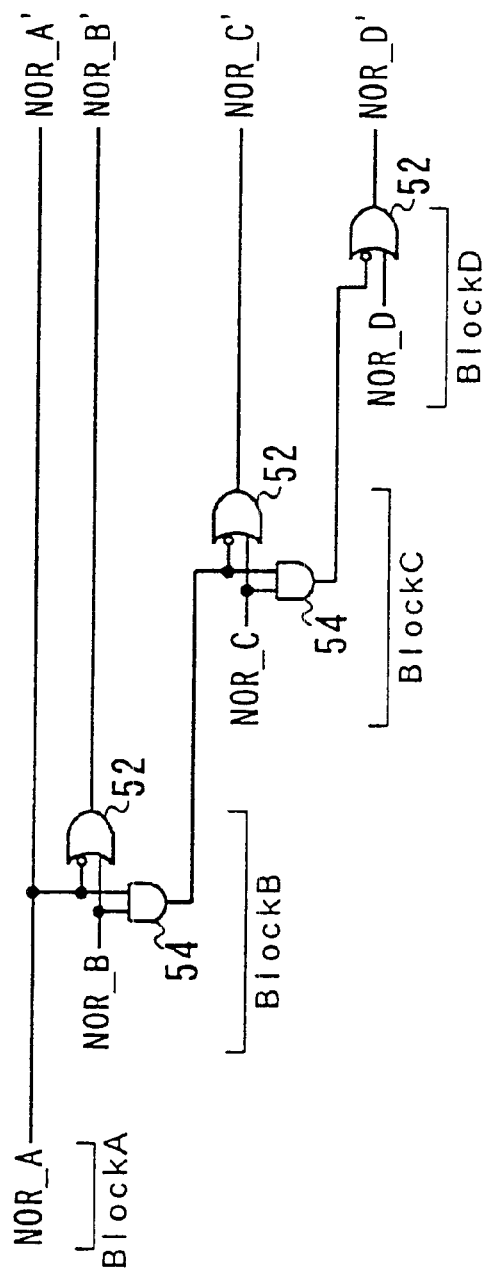
FIG. 10(a) is an enlarged circuit diagram showing another embodiment of a main part of the priority encoder of the present invention and FIG. 10(b) is a truth table showing inputs and outputs of the main part of the priority encoder shown in FIG. 10(a)

As shown in FIG. 10(*a*), the priority encoder may comprise OR circuits 52 and AND circuits 54. In this case, where a higher block is active ("0"), outputs NOR_A, NOR_B, NOR_C, and NOR_D in lower blocks are invalidated ("1"). FIG. 10(*b*) shows outputs (NOR_A', NOR_B', NOR_C', and NOR D') after invalidation. The signals shown in FIG. 10(*b*) can be input into an ordinal encoder having no priority to obtain two higher order bits ("A3 A2") of the output code. The circuits shown in FIG. 10(*a*) transforms the selectors 0, 1, 2, and 3 shown in FIG. 9 to simple selectors having no priority.

The priority encoder and the encoding method of the present invention can reduce the number of priority encoders used inside the greater whole priority encoder, so that its circuit size can be reduced. The use of OR circuits and AND circuits instead of priority encoders leads to the reduction in number of circuit stages, and therefore a high-speed encoding can be achieved. In the present invention, higher-order bits and lower-order bits can be encoded in parallel by separate two priority encoders, so that a higher-speed encoding can be achieved. Furthermore, by using the priority encoder and the encoding method of the present invention in a content addressable memory ("CAM"), memory subarray blocks can be downsized, so that downsizing, high-speed, and low power consumption of memory can be achieved.

Figure 11:
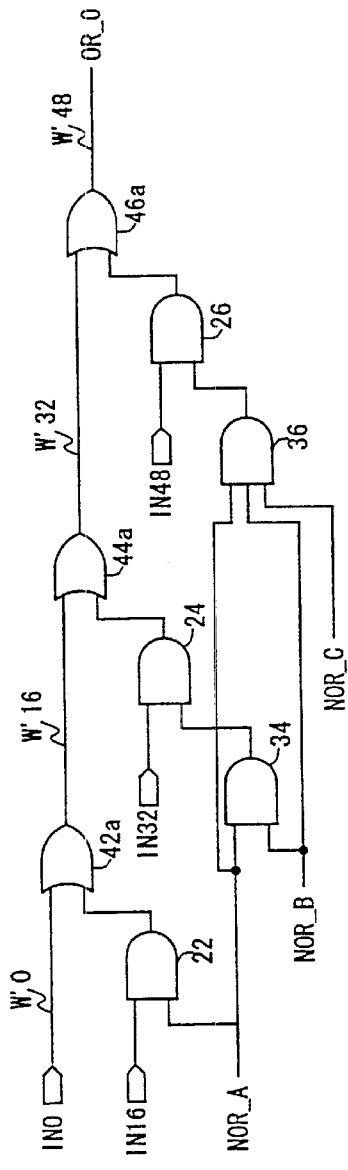
FIGS. 11(a) and 11(b) are circuit diagrams showing further embodiments of FIGS. 8(a) and 8(b).
Figure 11:
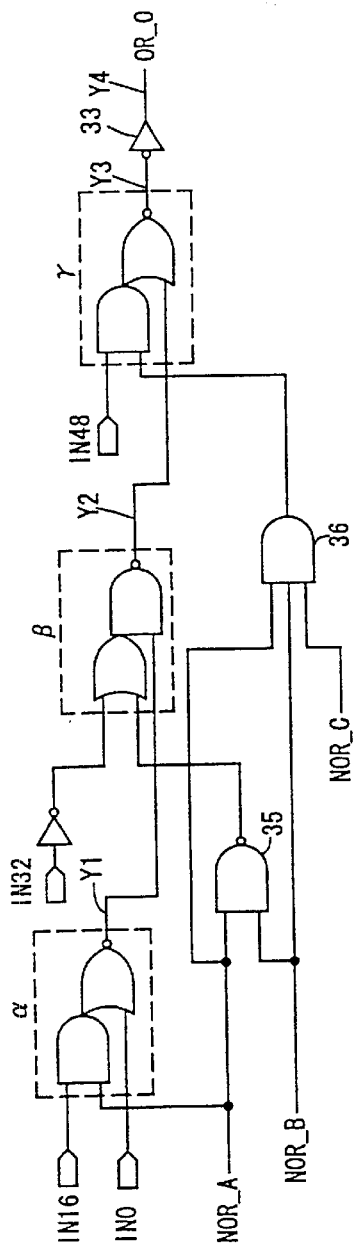

While the embodiments of the present invention have thus been described with reference to the drawings, it should be understood that the present invention be not limited to the embodiments shown in the drawings. For example, in circuitry shown in FIG. 11(*a*) in which the AND circuits 34 and 36 shown in FIG. 6 are added to the circuitry shown in FIG. 8(*b*), the number of components (the number of transistors) can be further reduced by employing positive and negative logic. Where the circuitry shown in FIG. 11(*a*) is CMOS (complementary metal-oxide semiconductor) static circuitry, six transistors are required in the AND circuits 22, 24, 26 and 34, and the OR circuits 42*a*, 44*a*, and 46*a*, and eight transistors are required in the AND circuit 36. Thus 50 transistors are required. In the case of the circuitry shown in FIG. 11(*b*), α, β, and γ parts of the circuitry may each consist of six transistors, a NAND circuit of four transistors, and a NOT circuit of two transistors. Thus the circuitry shown in FIG. 11(b) may be comprised of 34 transistors. Furthermore, as output Y1 of the α part and output Y3 of the γ part are negative logic and output Y2 of the β part and output Y4 of the NOT circuit 33 are positive logic, the NOT circuit 33 in the final stage can be omitted if the output OR_0 is received by a negative logic circuit. Thus the circuitry shown in FIG. 11(b) may be comprised of 32 transistors. Although the AND circuits 34 and 36 and the NAND circuit 35 are used only once in each higher-bit group, other circuits are repeatedly used in the same pattern in each higher-bit group. Assuming that an integer indicating the number of repetitions is n, the number of transistors required in the circuitry shown in FIG. 11(a) is (36n+14), and the number of transistors required in the circuitry shown in FIG. 11(b) is (22n+12), so that the difference between these circuities are (14n+2). As the integer n is higher, the number of transistors required in circuitry can be more reduced.

Figure 12:
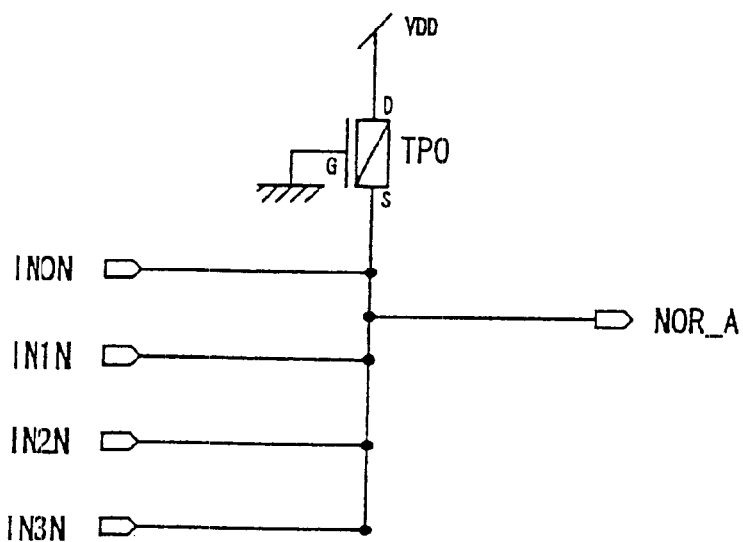
FIGS. 12(a) and 12(b) are circuit diagrams showing further examples of FIGS. 2(a) and 2(b).
Figure 12:
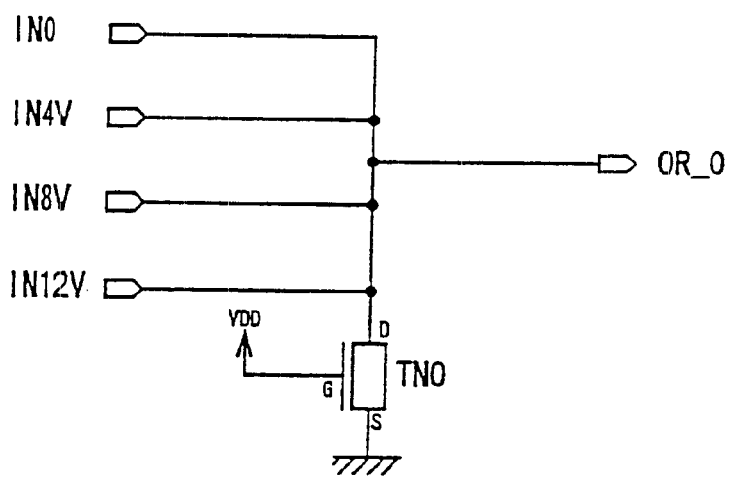
Figure 13:
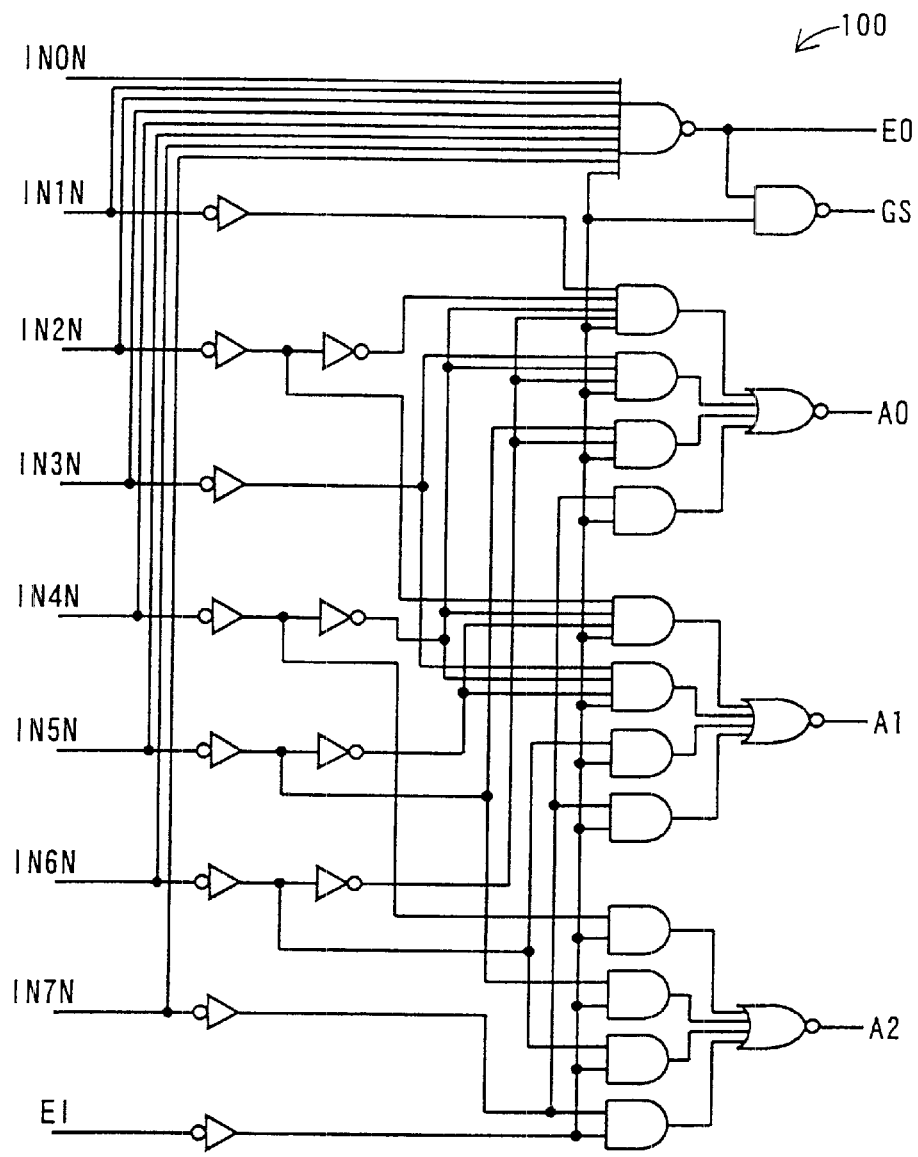
FIG. 13 is a circuit diagram showing an example of a conventional priority encoder.
Figure 15:
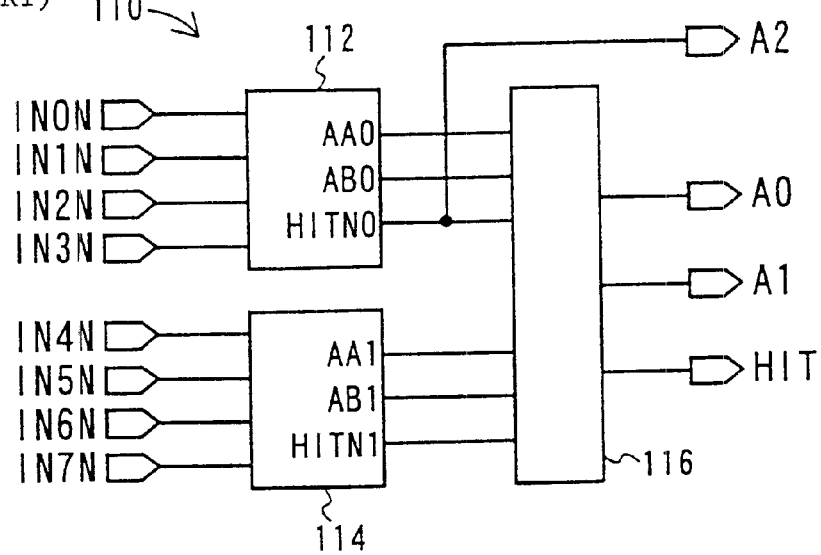
FIG. 15(a) is a circuit diagram showing another example of a conventional priority encoder.
FIG. 15(b) is a truth table showing inputs and output of the priority encoder shown in FIG. 15(a)
Figure 16:
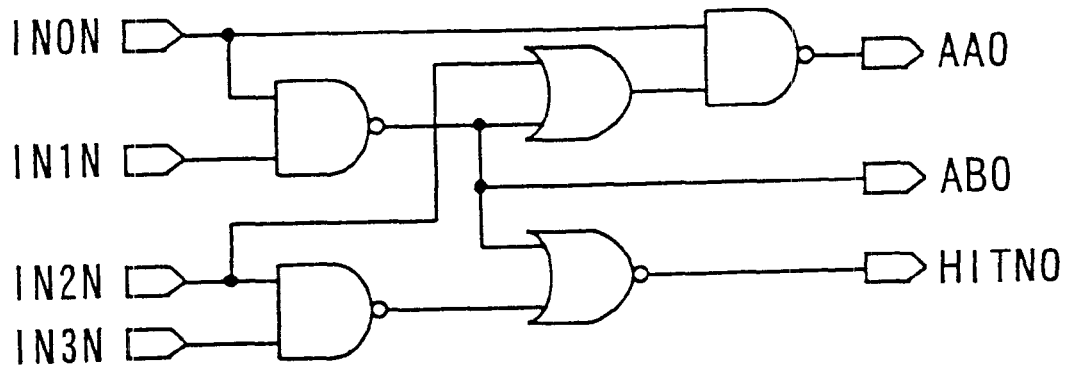
FIG. 16(a) is a circuit diagram showing an example of a priority encoder 112 included in the priority encoder shown in FIG. 15(a)
FIG. 16(b) is a truth table showing inputs and outputs of the priority encoder 112 shown in FIG. 16(a)
Figure 17:
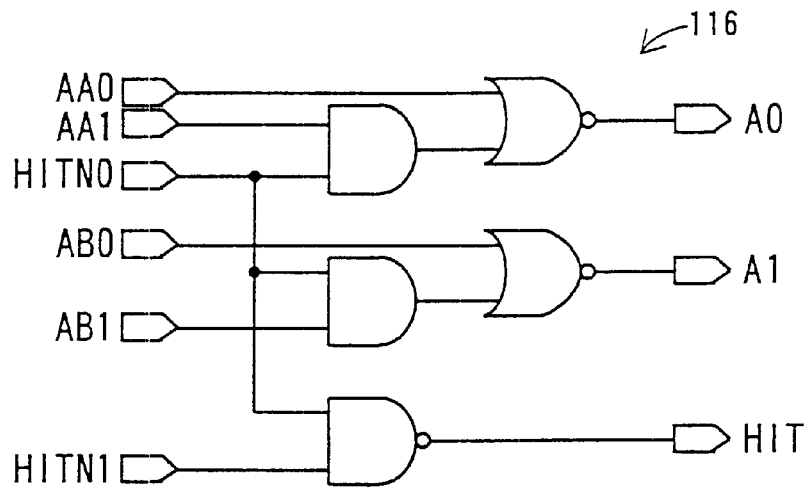
FIG. 17 is a circuit diagram showing an example of a selector circuit included in the priority encoder shown in FIG. 15(a)

The NOR circuit and the OR circuit shown in FIGS. 2(a) and 2(b) may be configured as shown in FIGS. 12(a) and 12(b). If the input lines IN0 to IN15 into the NOR circuits (12a, 12b, 12c and 12d) in FIG. 1 are driven by a open drain circuit of a nMOSFET (N-channel Metal Oxide Semiconductor Field Effect Transistor), a wired AND circuitry with a pull-up resistor can be used, so that the circuitry becomes simpler than the one shown in FIG. 2(a). In this case, however, since the inputs IN0N to IN15N are negative logic, the circuitry shown in FIG. 12(a) works as a NOR circuit, and TP0 is a substitute for a resistor. Alternatively, if the input lines IN0 to IN15v into the OR circuits (18a, 18b, 18c, and 18d) in FIG. 1 are driven by a pMOSFET open-drain circuit, a wired OR circuit with a pull-down resistor can be used, so that the circuitry become quite simple as shown in FIG. 12(b). In this case, TN0 is a substitute for a resistor. This circuitry requires only one wiring crossing the blocks A to D in FIG. 1. In both circuits shown in FIG. 12(a) and 12(b), DC current can be effectively controlled by controlling the gates in such a manner that transistors turns on only during a precharging period. Various improvements, modifications and variations can be made to the embodiments on the basis of knowledge of those skilled in the art without departing from the scope of the present invention.

What is claimed is:

1. A priority encoder which outputs a (m+n)-bit code corresponding to the number of the highest-priority input line among a plurality of input lines having a true value when true values are input to more than one of $2^{m+n}$ input lines which are numbered and prioritized on the basis of their numbers, comprising:

higher-order-bit encoding means for outputting a higher-order m-bit code corresponding to the group having the highest priority among those groups out of $2^m$ groups distinguished by higher-order m bits to which true values are input (hereinafter referred to as "highest-priority group distinguished by the higher-order m bits"); each of said $2^m$ groups consisting of $2^n$ input lines having common higher-order m bits of (m+n)-bit output code; and lower-order-bit encoding means for outputting a lower-order n-bit code corresponding to the input line having the highest priority among input lines to which true values are input, said lower-order-bit encoding means comprising means for invalidating the input of true values into input lines to groups having lower priorities than the highest-priority group distinguished by the higher-order m bits; said input lines being part of $2^n$ input lines which are distinguished by the lower n bits of the (m+n)-bit output code.

2. The priority encoder according to claim 1, wherein said higher-order-bit encoding means comprises:

means for detecting the input of true values into at least one of input lines in each of the groups distinguished by the higher-order m bits; and means for outputting the higher-order m-bit code corresponding to the highest-priority group among those groups distinguished by the higher-order m bits in which the input of true values are detected.

3. The priority encoder according to claim 2, wherein said lower-order-bit encoding means further comprises:

means for detecting the valid input of true values into $2^n$ groups distinguished by lower-order bits; each of said $2^n$ groups consisting of $2^m$ input lines having common lower-order n bits of the (m+n)-bit codes; and means for outputting the lower-order n-bit code corresponding to the highest-priority group among those groups distinguished by the lower-order n bits in which the valid input of true values is detected.

4. The priority encoder according to claim 3, wherein said means for detecting the input of true values into at least one of input lines to a group distinguished by the higher-order m bits is included in a circuit block of the group distinguished by the higher-order m bits.

5. The priority encoder according to claim 3, wherein said means for detecting the input of true values into at least one of input lines to a group distinguished by the higher-order m bits comprises an OR circuit or a NOR circuit which receives all the inputs in the group distinguished by the higher-order m bits.

6. The priority encoder according to claim 2, wherein said lower-order-bit encoding means comprises:

means for selecting input lines which are included in the highest-priority group distinguished by the higher-order m bits from the input lines to the groups distinguished by the lower-order n bits; and means for outputting the lower-order n-bit code corresponding to the input line having the highest priority among input lines to which true values are input; said input lines being part of said $2^n$ input lines selected from the input lines to the groups distinguished by the lower-order n bits.

7. The priority encoder according to claim 6, wherein said means for detecting the input of true values into at least one of input lines to a group distinguished by the higher-order m bits is included in a circuit block of the group distinguished by the higher-order m bits.

8. The priority encoder according to claim 6, wherein said means for detecting the input of true values into at least one of input lines to a group distinguished by the higher-order m bits comprises an OR circuit or a NOR circuit which receives all the inputs in the group distinguished by the higher-order m bits.

9. The priority encoder according to claim 2, wherein said means for detecting the input of true values into at least one of input lines to a group distinguished by the higher-order m bits comprises an OR circuit or a NOR circuit which receives all the inputs in the group distinguished by the higher-order m bits.

10. The priority encoder according to claim 2, wherein said means for invalidating the input of true values is included in circuit blocks of the group distinguished by the higher-order m bits.

11. The priority encoder according to claim 10, wherein said circuit blocks of the group distinguished by the higher-order m bits are placed in each subarray block of a memory.

12. The priority encoder according to claim 2, wherein said means for invalidating the input of true values comprises an AND circuit or a NAND circuit which receives respective inputs in a group distinguished by the higher-order m bits and signal indicating the presence or absence of the input of true value to a group having higher priority than the group distinguished by the higher-order m bits.

13. The priority encoder according to claim 2, wherein said means for detecting the input of true values into at least one of input lines to a group distinguished by the higher-order m bits is included in a circuit block of the group distinguished by the higher-order m bits.

14. The priority encoder according to claim 1, wherein said lower-order-bit encoding means further comprises:
    means for detecting the valid input of true values into $2^n$ groups distinguished by lower-order bits; each of said $2^n$ groups consisting of $2^m$ input lines having common lower-order n bits of the (m+n)-bit codes; and
    means for outputting the lower-order n-bit code corresponding to the highest-priority group among those groups distinguished by the lower-order n bits in which the valid input of true values is detected.

15. The priority encoder according to claim 4, wherein said means for detecting the input of true values into at least one of input lines to a group distinguished by the higher-order m bits is included in a circuit block of the group distinguished by the higher-order m bits.

16. The priority encoder according to claim 14, wherein said means for detecting the input of true values into at least one of input lines to a group distinguished by the higher-order m bits comprises an OR circuit or a NOR circuit which receives all the inputs in the group distinguished by the higher-order m bits.

17. The priority encoder according to claim 1, wherein said means for invalidating the input of true values is included in circuit blocks of the group distinguished by the higher-order m bits.

18. The priority encoder according to claim 17, wherein said circuit blocks of the group distinguished by the higher-order m bits are placed in each subarray block of a memory.

19. The priority encoder according to claim 1, wherein said means for invalidating the input of true values comprises an AND circuit or a NAND circuit which receives respective inputs in a group distinguished by the higher-order m bits and signal indicating the presence or absence of the input of true value to a group having higher priority than the group distinguished by the higher-order m bits.

20. The priority encoder according to claim 1, wherein said lower-order-bit encoding means comprises:
    means for selecting input lines which are included in the highest-priority group distinguished by the higher-order m bits from the input lines to the groups distinguished by the lower-order n bits; and
    means for outputting the lower-order n-bit code corresponding to the input line having the highest priority among input lines to which true values are input; said input lines being part of said $2^n$ input lines selected from the input lines to the groups distinguished by the lower-order n bits.

21. The priority encoder according to claim 20, wherein said means for detecting the input of true values into at least one of input lines to a group distinguished by the higher-order m bits is included in a circuit block of the group distinguished by the higher-order m bits.

22. The priority encoder according to claim 14, wherein said means for detecting the input of true values into at least one of input lines to a group distinguished by the higher-order m bits comprises an OR circuit or a NOR circuit which receives all the inputs in the group distinguished by the higher-order m bits.

23. An encoding method of a priority encoder, which outputs a code corresponding to the highest-priority input line among input lines having a true value when true values are input to more than one of input lines which are prioritized and given codes, comprising:
    higher-order-bit encoding step of outputting higher-order bits corresponding to the group having the highest priority among those groups distinguished by higher-order bits to which true values are input (hereinafter referred to as "highest-priority group distinguished by the higher-order bits"); each of said groups distinguished by higher-order bits comprising input lines which are grouped on the basis of higher-order bits of the code; and
    lower-order-bit encoding step of outputting lower-order bits corresponding to the input line having the highest priority among input lines to which true values are input, said lower-order-bit encoding step comprising invalidating the input of true values into input lines to groups having lower priorities than the highest-priority group distinguished by the higher-order bits; said input lines being part of input lines which are distinguished by the lower bits of the code.

24. The encoding method according to claim 23, wherein said higher-order-bit encoding step comprises the substeps of:
    detecting the input of true values into at least one of input lines to a group distinguished by the higher-order bits; and
    outputting the higher-order bits corresponding to the highest-priority group among those groups distinguished by the higher-order bits in which the input of true values is detected.

25. The encoding method according to claim 24, wherein said lower-order-bit encoding step comprises the substeps of:
    selecting input lines which are included in the highest-priority group distinguished by the higher-order bits from the input lines to the groups distinguished by the lower-order bits; and
    outputting the lower-order bits corresponding to the input line having the highest priority among input lines to which true values are input; said input lines being part of said input lines selected from the input lines to the groups distinguished by the lower-order bits.

26. The encoding method according to claim 24, wherein said lower-order-bit encoding step further comprises the substeps of:
    detecting the input of true values into groups of input lines after the invalidating step; each of said groups consisting of input lines having common lower-order bits of the codes; and outputting the lower-order bits corresponding to the highest-priority group among those groups distinguished by the lower-order bits in which the input of true values is detected.

27. The encoding method according to claim 23, wherein said lower-order-bit encoding step comprises the substeps of:

selecting input lines which are included in the highest-priority group distinguished by the higher-order bits from the input lines to the groups distinguished by the lower-order bits; and outputting the lower-order bits corresponding to the input line having the highest priority among input lines to which true values are input; said input lines being part of said input lines selected from the input lines to the groups distinguished by the lower-order bits.

28. The encoding method according to claim 23, wherein said lower-order-bit encoding step further comprises the substeps of:

detecting the input of true values into groups of input lines after the invalidating step; each of said groups consisting of input lines having common lower-order bits of the codes; and outputting the lower-order bits corresponding to the highest-priority group among those groups distinguished by the lower-order bits in which the input of true values is detected.

* * * * *